(12) United States Patent
Hashizume et al.

(10) Patent No.: US 6,484,957 B1
(45) Date of Patent: Nov. 26, 2002

(54) TAPE CASSETTE AND COMBINATION STRUCTURE OF THE TAPE CASSETTE AND DRIVING DEVICE

(75) Inventors: Kenji Hashizume, Tokyo (JP); Shinichi Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/556,914

(22) Filed: Apr. 21, 2000

(30) Foreign Application Priority Data

Apr. 28, 1999  (JP) ............................................ 11-121819

(51) Int. Cl.7 ............................................ G11B 23/087
(52) U.S. Cl. ...................................... 242/342; 360/132
(58) Field of Search ................................ 242/340, 342, 242/348; 360/132

(56) References Cited

U.S. PATENT DOCUMENTS 3,756,521 A  *  9/1973  Werner ........................ 242/342

5,143,317 A  *  9/1992  Sugiyama ..................... 242/343

FOREIGN PATENT DOCUMENTS

| JP | 7-41775 | 7/1995 |
| JP | 9-73758 | 3/1997 |

* cited by examiner

Primary Examiner—John Q. Nguyen
(74) Attorney, Agent, or Firm—Darby & Darby (57) ABSTRACT

A tape cassette providing a case body and a couple of hubs set rotatably in the case body, around which a tape-like member is wound, and a combination structure of the tape cassette and a driving device. The hub members provide a through hole in which a rotative driving spindle of a driving device is to be inserted through an insertion opening and a plurality of spline projections formed at an interior of the through hole, and the spline projection widens toward the insertion opening gradually. When the hub members are rotatively driven under an engagement of the spline projection thereof with an engagement projection of the rotative driving spindle of the driving device, since the hub member is forced toward the insertion opening, the hub member is moved toward the insertion opening, and it is consequently rotated stably at the location where it is moved to.

1 Claim, 11 Drawing Sheets

TAPE CASSETTE AND COMBINATION STRUCTURE OF THE TAPE CASSETTE AND DRIVING DEVICE

BACKGROUND OF THE INVENTION

1. Field of the Invention

The present invention relates to a tape cassette for digital recording/reproducing, such as DDS (digital data storage) and DAT (digital audio tape), and to a combination structure of the tape cassette and a driving device for driving the tape cassette.

2. Related Background Art

The conventional DAT or DDS tape cassette for digital recording/reproducing, in a case body consisting of an upper case and a lower case thereof, supports a couple of hubs around which a tape is wound so as to be rotatable, and includes a couple of holes in the lower case into which the driving spindles of the recording/reproducing device are inserted, and a slider which covers the couple of the holes slidably. The couple of hubs around which a tape is wound is arranged between the upper sheet and the lower sheet. For stabilization of tape running in the tape cassette, for instance, in a gazette of Japanese Patent Application Laid-Open No. 9-73758, it is laid open to provide projections and recesses on the friction sheets pinching a couple of the hubs to be rotated, around which a tape is wound.

In a gazette of Japanese Utility Model Application Laid-Open No. 7-41775, it is also laid open to provide a spring member which pushes the hubs pinched between the friction sheets, to the lower case.

Although DAT or DDS tape cassette for digital recording/reproducing is used for music and data storage of a computer, recently, it is in need of bigger capacity of memory for data storage. On the cassette tape for such a usage, when the driving spindles of the driving device is engaged with the hubs or during tape running, even if the locations of the hubs are slightly slid vertically, it will be a problem to make an instability of tape running. If such problem arises, there may be a possibility of an error.

Against such problem, even if projections and recesses are provided on the friction sheet as laid open in the gazette of Japanese Patent Application Laid-Open No. 9-73758, since such the projections and recesses are provided in order to prevent from disarrangement of tape winding, not to set the hubs to a regular position, a sufficient effect may not be obtained. Although it is possible to utilize a spring member as laid open in the gazette of Japanese Utility Model Application Laid-Open No. 7-41775, since a quantity of parts may be increased, and assembling processes may consequently be increased, it will make a cost up. In addition, it needs a space for arrangement of the spring members, and therefore makes a difficulty to keep the space in the tape cassette.

SUMMARY OF THE INVENTION

It is an object of the present invention to provide a tape cassette capable of preventing an error from occurring during recording or reproducing, by positioning the hubs to the regular position during tape running thereby stabilizing of the tape running, and a combination structure of the tape cassette and a driving device for driving the tape cassette.

According to the aspect of the invention, the tape cassette is provided with a case body, and a couple of hub members stored rotatably in the case body, around which a tape-like member is wound, wherein the hub members includes through holes for insertion of a rotative driving spindles of the driving device through an insertion openings and a plurality of spline projections formed at an interior of the through holes, and the spline projections widen toward the insertion opening gradually.

According to the tape cassette, since the spline projections in the through hole of the hub member is slanted so as to widen toward the insertion opening, when the rotative driving spindles of the driving device engage the spline projections widened toward the insertion opening, and the hub members are rotatably driven, the force toward the insertion opening is exerted on the hub members, so that the hub members are moved toward the insertion opening and the hub members are rotatably driven stably at the moved position. Thus, the tape running at the hub members is stabilized, an error is prevented from occurring during recording and reproducing, accordingly. Further, a sheet part may be arranged between the case body and the hub pats.

During rotative driving of the hub members with the driving device, a side face of the engagement projection of the rotative driving spindles contacts with a side face of each the spline projection, and the hub members are moved toward the insertion opening and rotated thereat.

According to another aspect of the invention, a combination structure of the tape cassette and the driving device is, of a combination structure of the case body, the tape cassette including a couple of hub members stored rotatably in the case, around which a tape-like member is wound, and the driving device including the rotative driving spindles for rotative driving of the hub members when the tape cassette is set therein, the combination structure includes the hub member including a through hole for insertion of the rotative driving spindle through the insertion opening and a plurality of spline projections formed at an interior of the through hole, the spline projections widening toward the insertion opening gradually, and engagement projections for engaging with the spline projections and arranged at the rotative driving spindle.

According to the combination structure, when the engagement projections of the rotative driving spindle of driving device engage the spline projections slanted so as to widen toward the insertion opening of the through hole, the force toward the insertion opening is exerted on the hub members, the hub members are therefore moved toward the insertion opening, and the hub member is rotatably driven stably at the moved position. Thus, the hub member is not moved in any direction in which the through hole extends, during driving in the driving device, the tape running is therefore stabilized, and an error is prevented from occurring during recording and reproducing accordingly.

By provision of the engagement projection of the rotative diving spindle so as to match the form of spline projection, the hub member is forced toward the insertion opening more strictly, and the tape running with the hub members is therefore stabilized more steadily. During rotative driving of the hub members with the driving device, a side face of each the engagement projection of the rotative driving spindle contacts with a side face of each the spline projection, and the hub member is moved toward the insertion opening and rotated thereat.

Each the spline projection includes a tapered portion at the insertion opening end, and each the engagement projection of the rotative driving spindle has a wide portion in correspondence with the tapered portion, and during rotative driving of the hub members by the driving device, each the wide portion contacts with the tapered portion to control the moved position of the hub member. In such a manner, the position of the hub members, which are moving during the rotative driving, may be regulated and adjusted.

DETAILED DESCRIPTION OF THE PREFERRED EMBODIMENTS

Embodiments according to the present invention will hereinafter be described with reference to the accompanying drawings.

The First Embodiment

Figure 1:
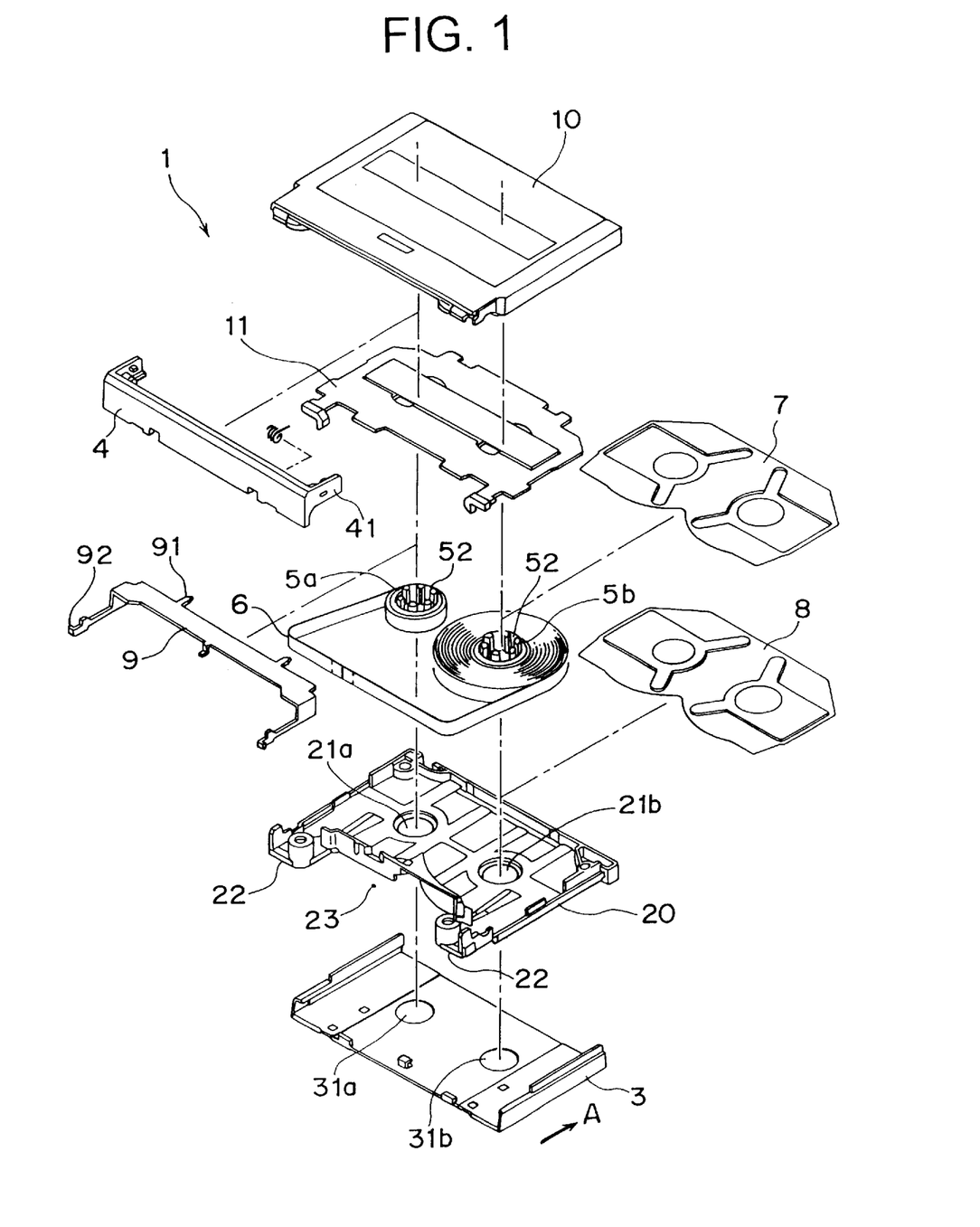
FIG. 1 is an oblique view of a disassembled tape cassette for DAT showing one embodiment.
Figure 2A:
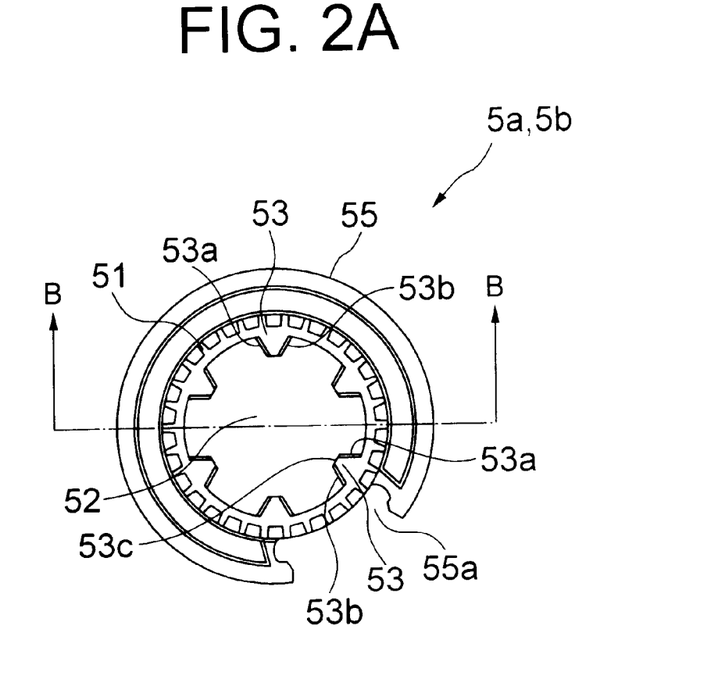
FIG. 2A is a plan view showing a hub member in FIG. 1.
Figure 2B:
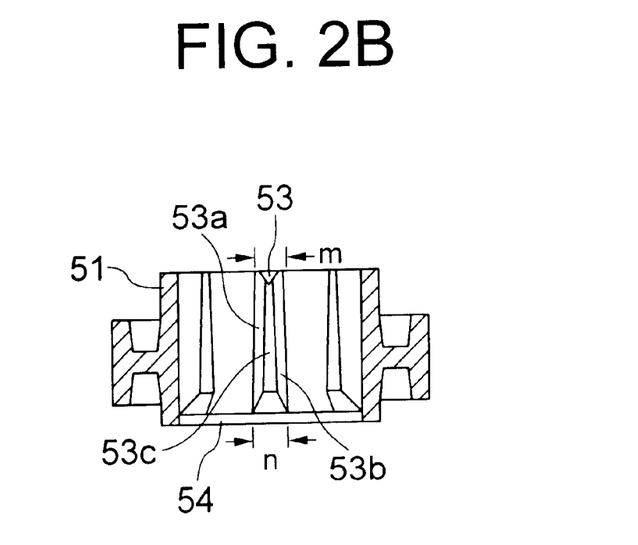
FIG. 2B is a sectional view taken along the line B—B in FIG. 2A.
Figure 3A:
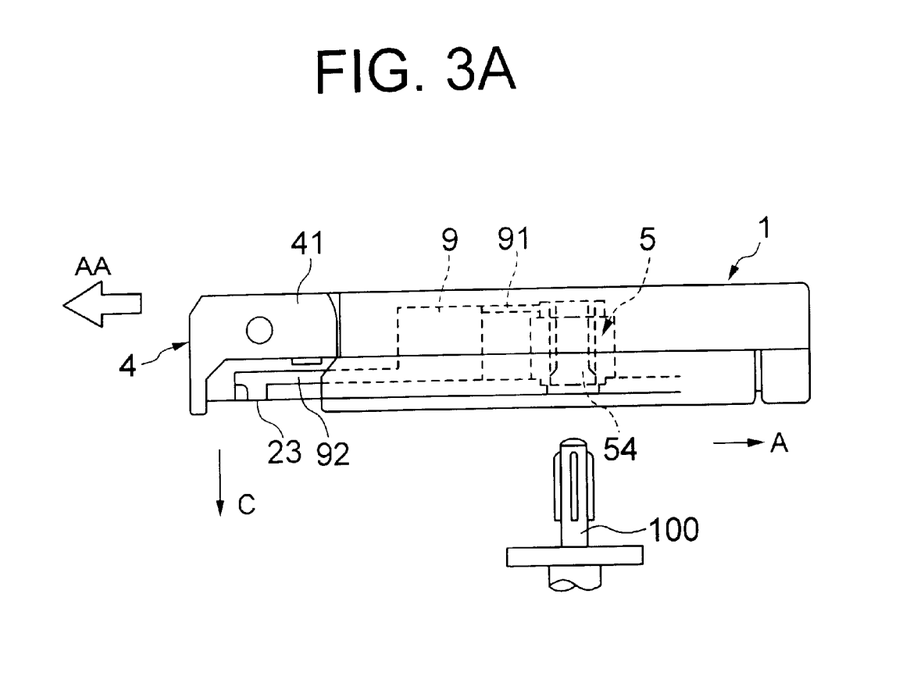
FIG. 3A is a side view showing a relation of the positions between the cassette tape and a rotative driving spindle when the cassette tape in FIG. 1 is set into a driving device.
Figure 3B:
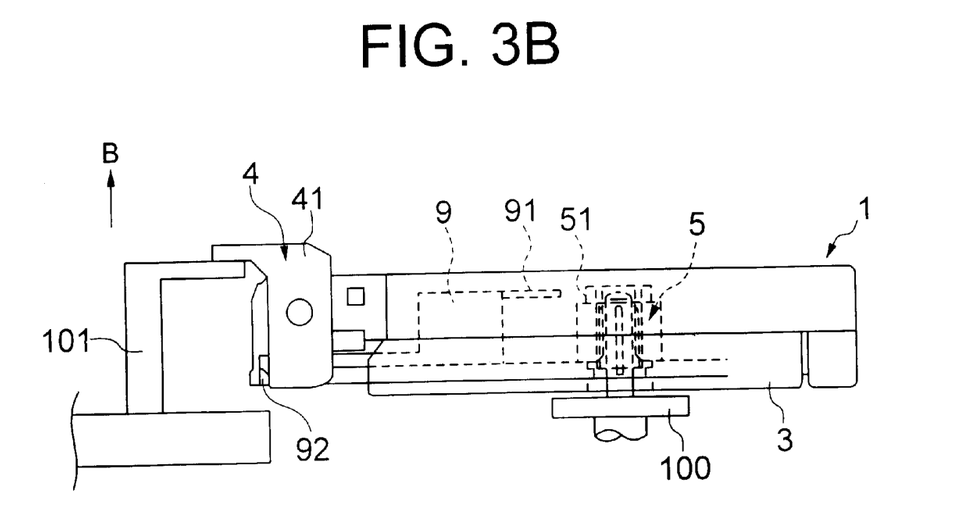
FIG. 3B is a side view showing such a state that the cassette tape is set in the driving device.
Figure 4:
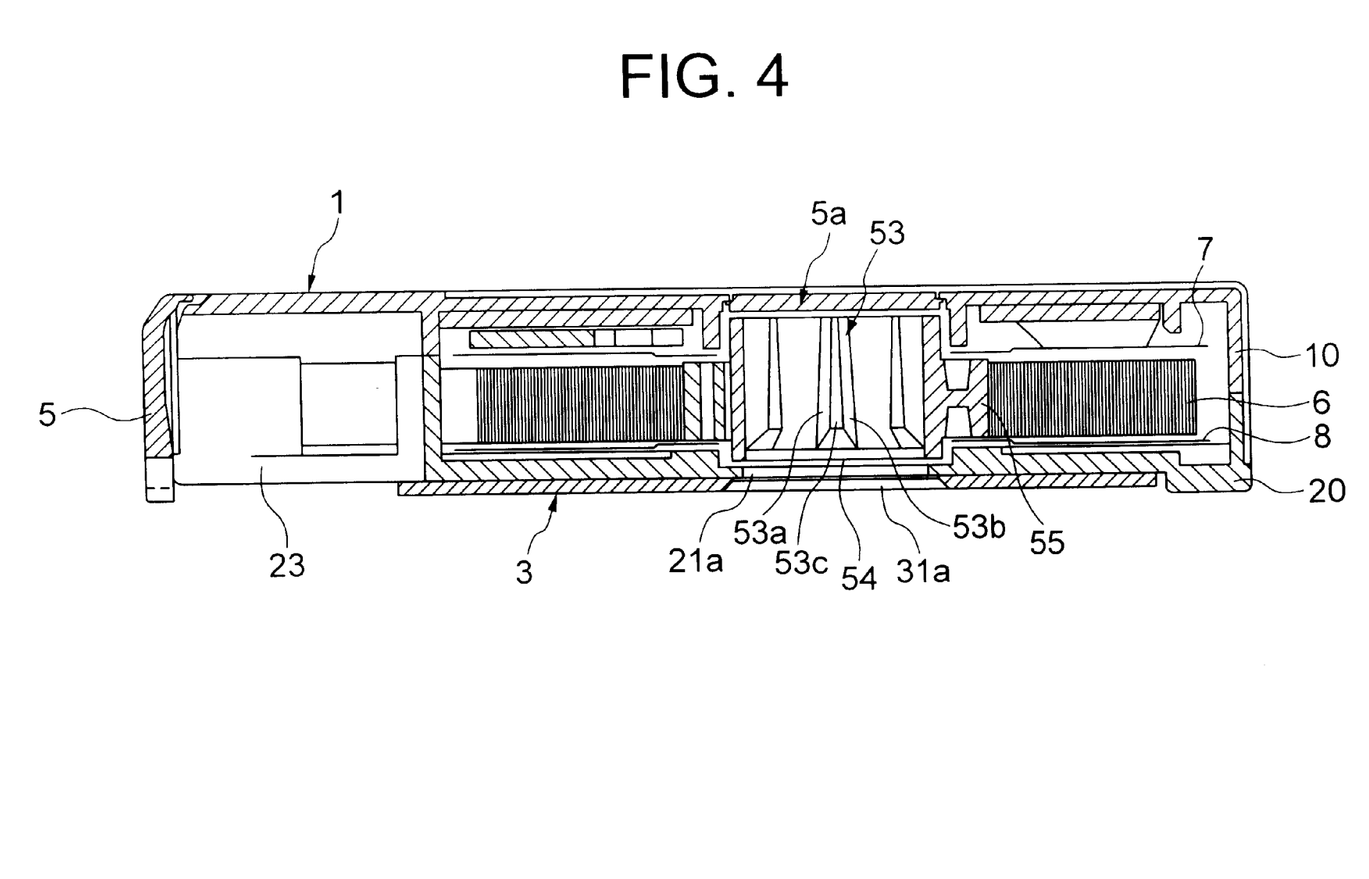
FIG. 4 is a sectional view of the tape cassette in FIG. 1 in the sliding direction of the slider.
Figure 5A:
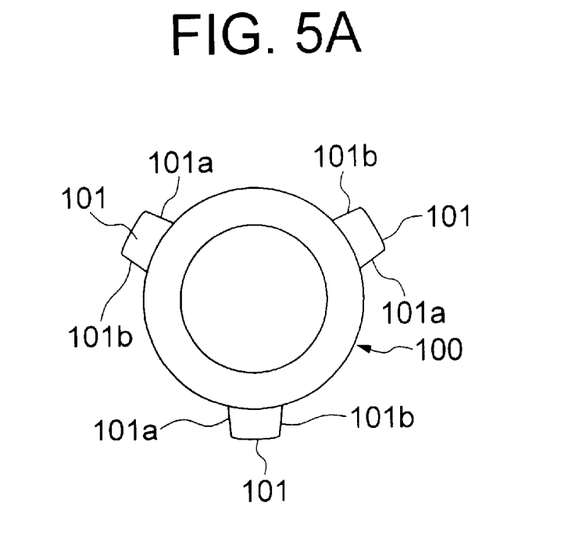
FIG. 5A is a plane view showing the rotative driving spindle of the driving device in FIG. 3A.
Figure 5B:
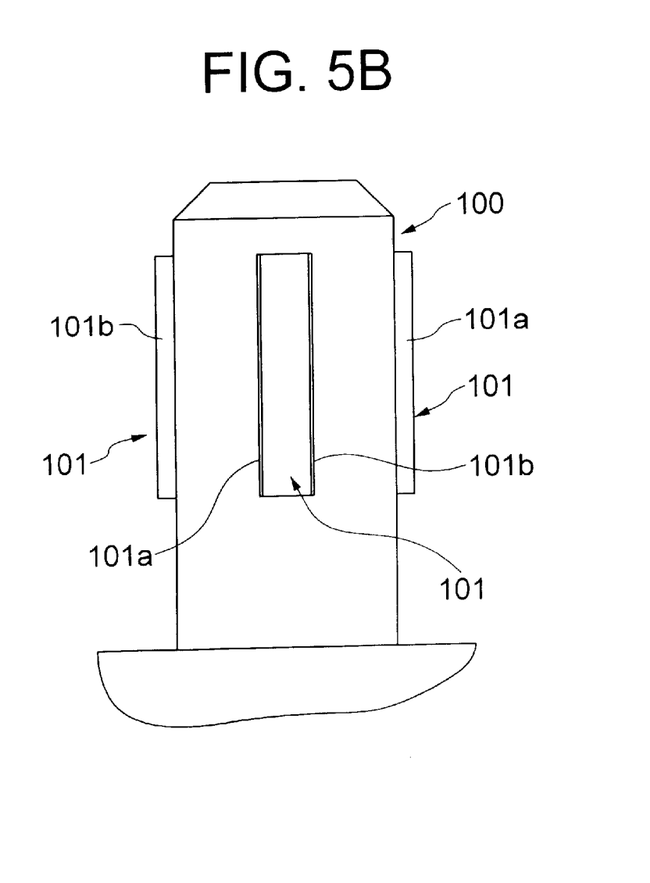
FIG. 5B is a side view thereof.
Figure 6A:
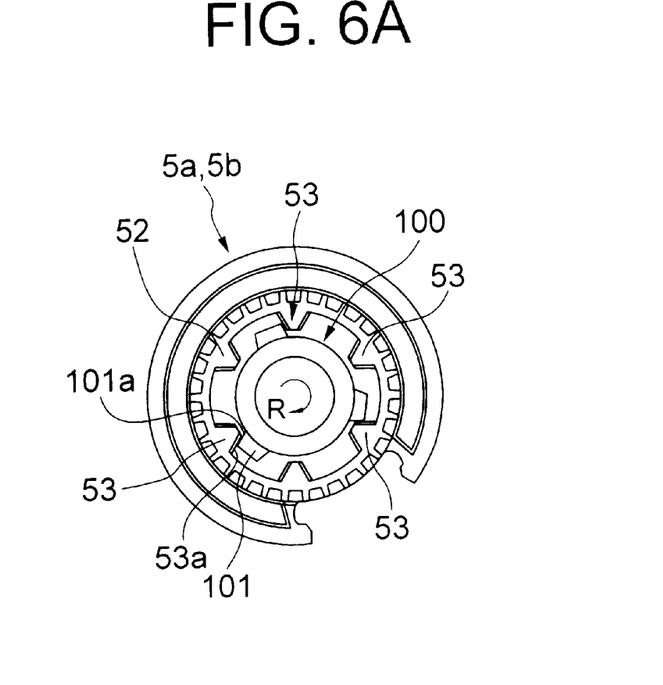
FIG. 6A is a plane view showing such a state that the rotative driving spindle in FIG. 4 engages the hub member in FIG. 2A.
Figure 6B:
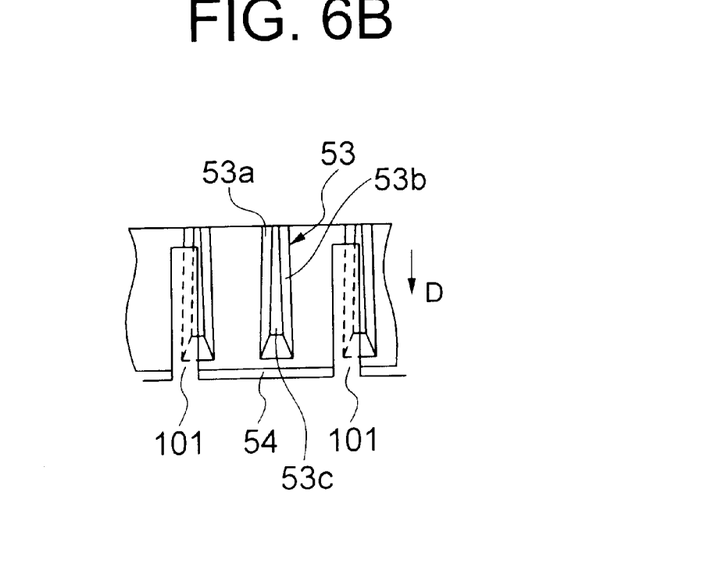
FIG. 6B is a developed side view thereof.

FIG. 1 is a perspective view of a disassembled tape cassette for DAT showing the first embodiment, FIG. 2A is a plane view of the hub member shown in FIG. 1, FIG. 2B is a sectional view taken along the line B—B in FIG. 2A, FIG. 3A is a side view showing a relation between the position of a cassette tape and the position of the rotative driving spindle when the cassette tape in FIG. 1 is set in a driving device, FIG. 3B is a side view showing such a state that the cassette tape is set in the driving device, FIG. 4 is a sectional view of the tape cassette in FIG. 1 in the sliding direction, FIG. 5A is a plane view showing the rotative driving spindle of the driving device in FIG. 3A, FIG. 5B is a side view thereof, FIG. 6A is a plane view showing such a state that the rotative driving spindle in FIG. 4 engages the hub member in FIG. 2A, FIG. 6B is a developed side view thereof.

As illustrated in FIG. 1 and FIG. 4, the tape cassette 1 for DAT is provided with an upper case 10, a lower case 20 having the insertion holes 21a and 21b for the rotative driving spindle 100 (FIG. 3A) of a driving device, a front cover 4 provided in a front face of the upper case 10 so as to be rotatable at a side shoulder 41, and the slider 3 having two (2) circular openings 31a and 31b, provided so as to be slidable on a face of the lower case 20. In a body case consisting of the upper case 10 and the lower case 20, a couple of the hub members 5a and 5b are stored so as to be rotatable, in which the tape 6 may be wound as a tape-like member around the reel thereof. At the center of the hub members 5a and 5b, the through holes 51a and 51b are formed, into which the rotative driving spindle 100 (FIG. 3A) is inserted. At an interior of the upper case 10, the window member 11 is furnished.

In a body case of the tape cassette 1, the upper and the lower sheet 7 and 8 are arranged so as to pinch the hub members 5a and 5b to stabilize a running of the tape 6. The tape 6 is, for instance, drawn from the hub member 5b and fed out of the case body through one of the tape pulling out opening 22, and wound around the hub member 5a through the another opening 22. While the tape cassette 1 is not used, the tape 6 placed out of the body case is protected with the slider 3 and the front cover 4. The hub brake 9 is provided in the case body for prevention from a contraction of the tape 6, the braking pawl 91 is furnished to lock the hub members 5a and 5b by engagement with the teeth part 51 (FIG. 2A) thereof when the cassette is not used, and the release part 92 is furnished to release the lock when the tape cassette is used.

The slider 3 covering the lower case 20 closes the hollow part 23 in a close position, which is formed in the case body for tape-loading, and opens the hollow part 23 by sliding toward the direction A. In such an open position, the openings 31a and 31b come to match the insertion holes 21a and 21b, respectively, and it makes possible to insert the rotative driving spindle 100 (FIG. 3A) the through hole 52, 52 of the hub members 5a and 5b from the device.

As shown in FIG. 2A and FIG. 2B, the hub members 5a and 5b are composed of an outer drum 55 where the tape 6 is wound around, a through hole 52 into which the driving spindle 100 (FIG. 3A) of the driving device is inserted through the opening 54 at the lower face, and the teeth part 51 which engage the brake pawls 91 of the hub brake 9 formed on the upper face. The tape is fixed to the groove 55a of the outer drum 55 at the end thereof by pinching with a clamp part (not shown).

At the interior face of the through hole 52, a plurality of (six pieces in FIG. 2A) spline projections 53 are arranged equally in the circumferential direction, and widen toward the lower face (side of insertion opening 54) of the hub members 5a and 5b. This is, as illustrated in FIG. 2B, the width at the root of each of the spline projection 53 is lineally increased from the upper face to the lower face so that the narrow width m at the upper face comes the wider width at the lower face (side of insertion opening 54). The spline projections 53 are formed so that the side faces 53a and 53b are projected aslant from the root thereof and the top position 53c is flat. The side faces 53a and 53b are slanted so as to widen in the axis direction toward the insertion opening 54, thereby giving the spline projections 53 an outward taper.

Given next is an explanation of the driving device (recording/reproducing device) with reference to FIG. 3A and FIG. 3B. The tape cassette 1 is inserted into the driving device from the side of the front cover 4 in a direction AA as shown in FIG. 3A. At this time, the slider 3 is moved rearward (in a direction A), and the under face of the hollow 23 for tape-loading is thereby opened. The openings 31a and 31b come to match with the insertion holes 21a and 21b of the lower case 20, respectively, and the hub members 5a and 5b come to be feasible for engagement with the driving spindle 100 of the driving device. In next step, the tape cassette 1 is moved in the direction C to the under portion of FIG. 3A, whereby the front cover 4 is rotated in the rotation direction B with the opening member 101 of the device, and opened. The side shoulder 41 of the front cover 4 engages the releasing part 92 of the hub brake 9 and moves the hub brake 9 forward (direction AA), and an engagement of the brake pawl 91 and tooth part 51 is thereby released and become to be feasible for rotation. Simultaneously, the rotative driving spindle 100 is inserted into the through holes 52 of the hub member 5a and 5b, and becomes to such a state to drive the hub members 5a and 5b as illustrated in FIG. 3B.

As shown in FIG. 5A and FIG. 5B, the rotative driving spindle 100 of the driving device in FIG. 3A is formed cylindrically, and three (3) engagement projections 101 elongated in axial direction are provided on the circumferential face thereof. Each engagement projection 101 is equally arranged in the circumferential direction, is projected to a radius direction to form side faces 101a, 101b to have same width in an axial direction. When the rotative driving spindle 101 is rotated during driving of the tape cassette 1, each engagement projection 101 contacts with the spline projection 53 of the hub members 5a and 5b, thereby rotating the hub members 5a and 5b.

When the tape cassette 1 is set in the driving device in FIG. 3A for recording or reproducing, as shown in FIG. 3B, the hub members 5a and 5b are made possible to rotate by releasing an engagement with the hub brake 9, and the rotative driving spindle 100 is coincidentally inserted into the through hole 52 of hub members 5a, 5b. As shown in FIG. 6A and 6B, when the rotative driving spindle 100 is rotated to the direction R with the driving device, then each engagement projection 101 of the rotative driving spindle 100 engages every other spline projection 53, and the side face 101a of the engagement projection 101 is contacted with the side face 53a of the spline projections 53 at the through hole 52 of the hub members 5a and 5b. In this case, the width of the engagement projection 101 of the rotative driving spindle 100 is same in an axial direction, and the spline projection 53 widens toward the insertion opening 54 at the side face 53a, the side face 101a of the engagement projection 101 contacts with the side face 53a of the spline projection 53 at the lower end, accordingly. In this time, since the side face 53a slanted so as to widen toward the lower end is forced in the direction D from the side face 101 of the engagement projection 101a, the force toward the insertion opening 54 in the direction D in FIG. 6B is exerted on the hub members 5a, 5b. In such a manner, the force is exerted on the hub members 5a, 5b with following the rotation thereof, so that the hub members 5a, 5b are attracted to the lower portion of the figure, thereby being moved to the side of the insertion opening 54. As a result, the hub members can rotate firmly without vertical movement at the position where they are moved to. Thus, tape running at the hub members 5a and 5b is stabilized, and it can be prevented from an error occurred during recording or reproducing.

The Second Embodiment

Figure 7A:
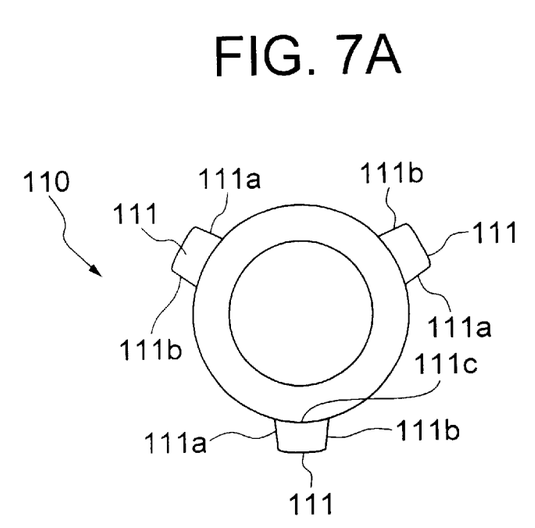
FIG. 7A is a plane view showing a rotative driving spindle of a driving device in another embodiment.

The second embodiment will hereinafter be explained with reference to FIG. 7A, FIG. 7B, FIG. 8A and FIG. 8B. The embodiment is as same the construction of the first embodiment, except that the form of the engagement projection of the driving device is modified so as to fit the form of the spline projection in the through hole of the hub members, and therefore, the same symbol is used to the same part, and it is omitted to explain. FIG. 7A is a plane view showing the rotative driving spindle of the driving device in the embodiment, FIG. 7B is the side view thereof, FIG. 8A is a plane view showing such a state that the rotative driving spindle in FIG. 7A engages the hub member in FIG. 3A, and FIG. 8B is a developed side view thereof.

Figure 7B:
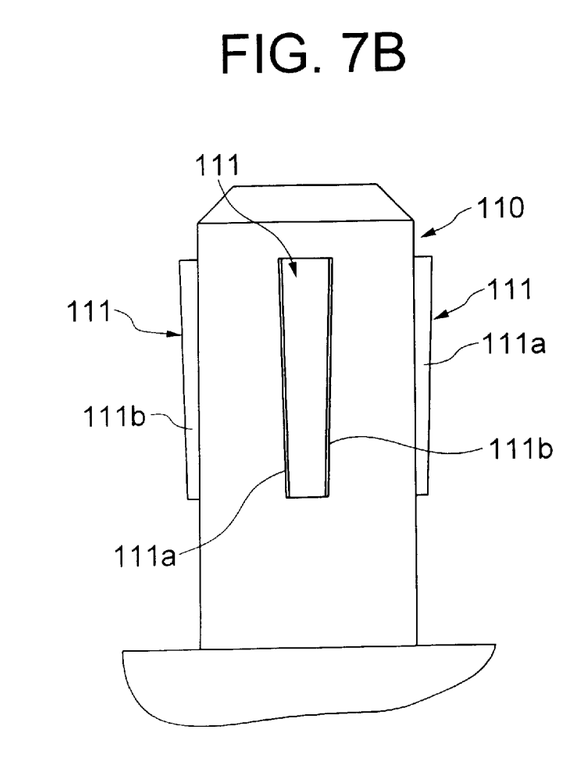
FIG. 7B is a side view thereof.
Figure 8A:
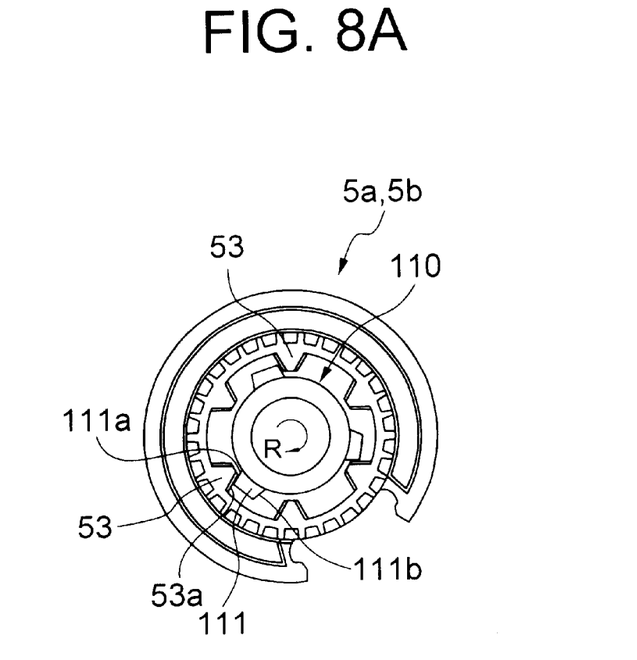
FIG. 8A is a plane view showing such a state that a rotative driving spindle in FIG. 7A engages the hub member in FIG. 3.
Figure 8B:
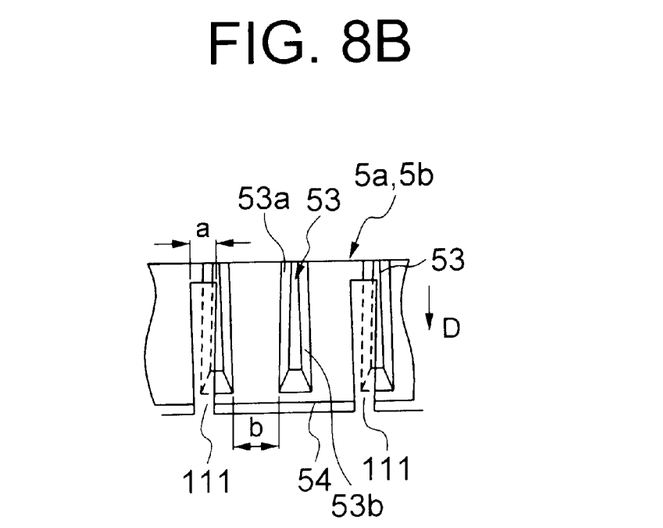
FIG. 8B is a developed side view thereof.

As shown in FIG. 7A and FIG. 7B, a rotative driving spindle 110 of the driving device in FIG. 3A is formed cylindrically, and on the circumferential face thereof, three (3) engagement projections 111 are formed in axial direction and arranged equally in the circumferential direction, and are projected to the radius direction to form the side faces 111a and 111b. Each engagement projection 111 is, for making a form to match the spline projection 53 in FIG. 2A, slanted in the axial direction so that the width of a root 111c at the upper portion of the drawing is more than that at the lower portion in axial direction of the rotative driving device, and the side face 111a and 111b is also slanted to the axial direction to correspond with such slanting.

By provision of the engagement projection 111 of the rotative driving spindle as mentioned above, as shown in FIG. 8A and FIG. 8B, the side face 111a of the engagement projection 111, in which the width of upper portion is more than that of lower portion, entirely engages and contacts with the side face 53a of the spline projection 53 of the hub members 5a and 5b. In this case, the side face 53a slanted to widen toward the lower end is forced by the side face 111a of the engagement projection 111 to the direction D at the wider area than that in FIG. 6A. Therefore, the force toward the insertion opening 54 shown as direction D in FIG. 6B is exerted more strictly on the hub members 5a and 5b. Thus, the force is applied to the hub members 5a and 5b, so that the hub members are attracted to the lower portion with following the rotation thereof, to thereby be moved to the lower portion, and can rotate stably at the moved portion. In such a manner, a tape running with the hub members 5a and 5b is stabilized more, and it may be prevented from an error occurring during recording and reproducing.

According to the embodiment, by the combination structure of the cassette tape 1 in accordance with the first embodiment and the driving device furnishing the rotative driving spindle 110, the hub members of the tape cassette 1 set in the driving device are strictly positioned at the lower case 20, and the hub members are not moved vertically during tape running, more stable running may be obtained, accordingly. For the combination structure of the tape cassette 1 and the driving device, the rotative driving spindle of the driving device may be of FIGS. 5A and 5B. By making a formation so that a space b between the spline projections 53 at the lower end of hub members is wider than the width a of the wide top end of the rotative driving device 110, the rotative driving spindle 110 does not interfere with the through hole 52 when a cassette tape is set into or taken out from the driving device.

Figure 9A:
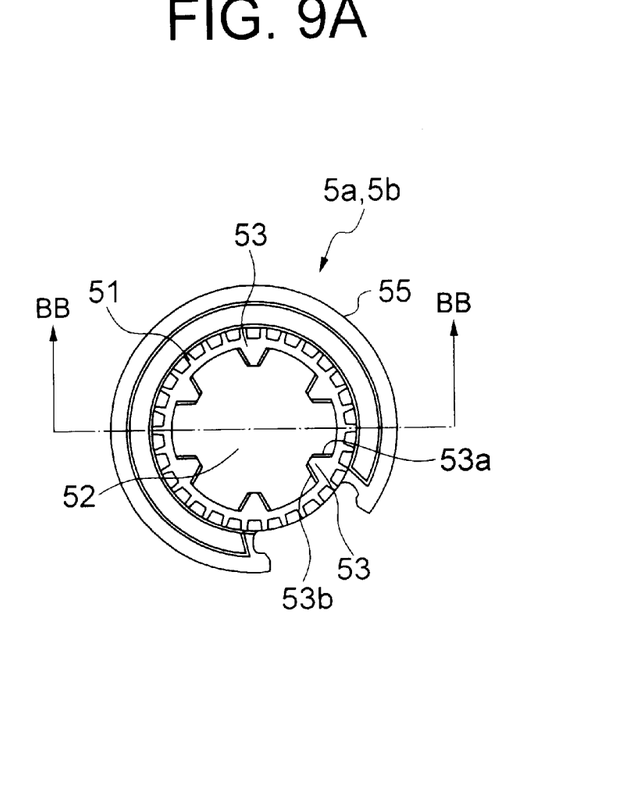
FIG. 9A is a plane view of a hub member shown as a modified example of the second embodiment.
Figure 9B:
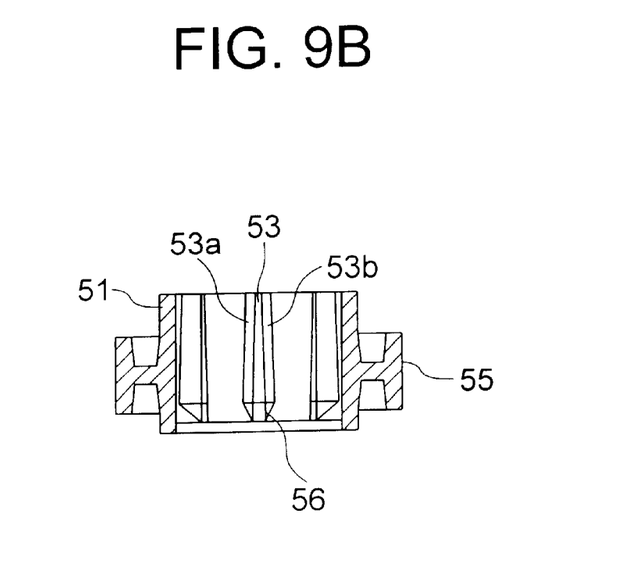
FIG. 9B is a vertical sectional view taken along the line BB—BB of FIG. 9A.
Figure 10A:
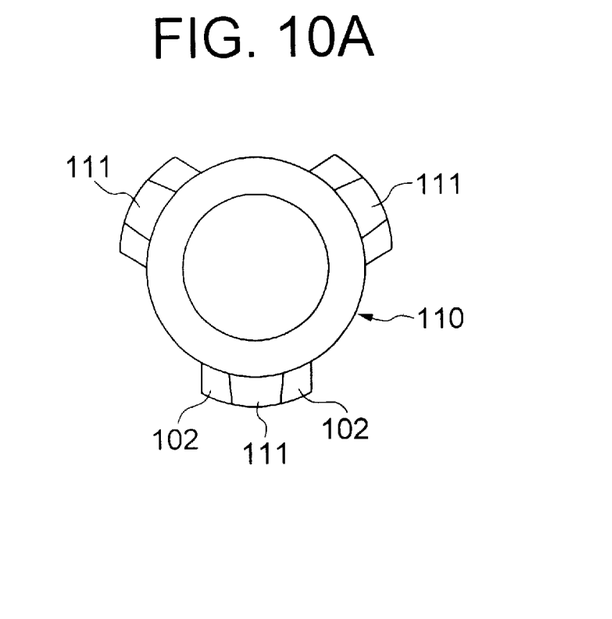
FIG. 10A is a plane view showing the rotative driving spindle of the driving device as a modified example of the another embodiment.
Figure 10B:
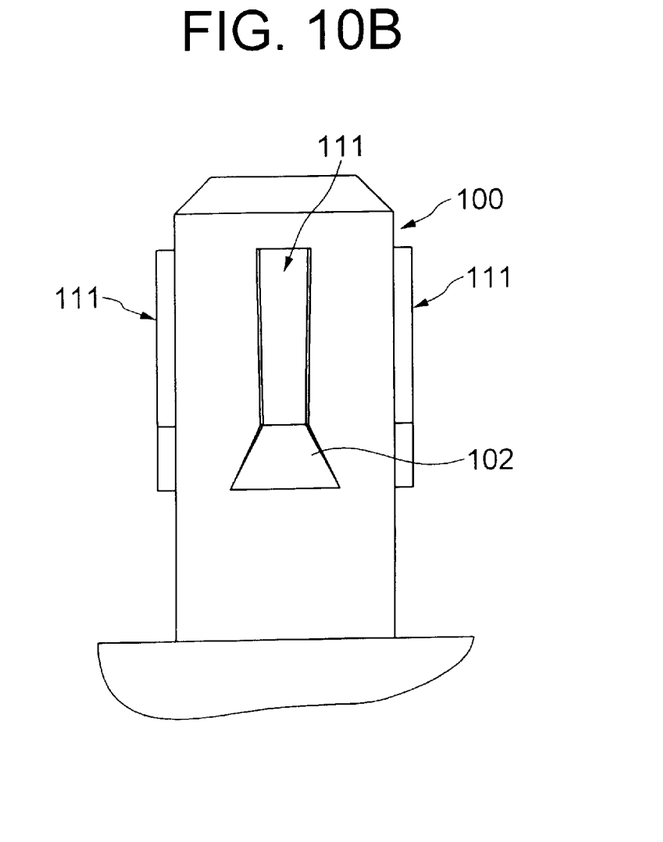
FIG. 10B is a perspective view thereof.
Figure 11A:
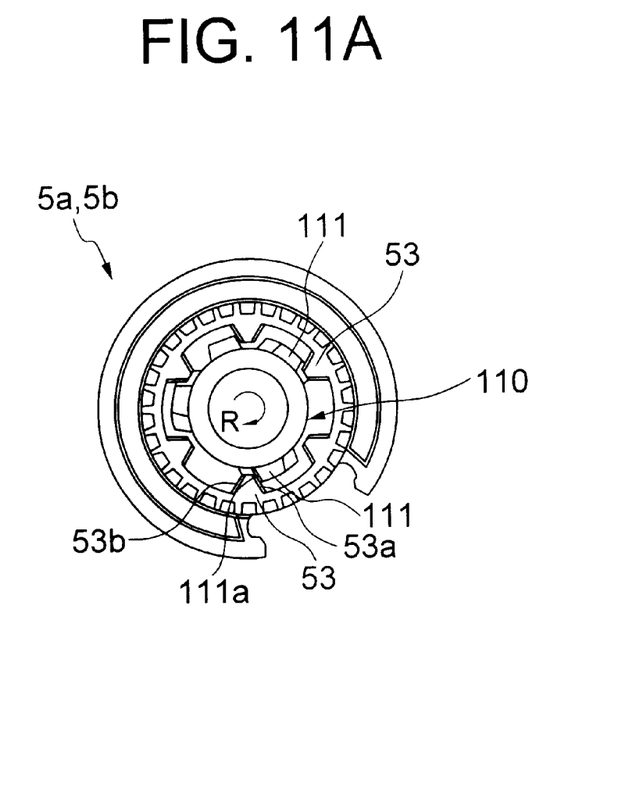
FIG. 11A is a plane view showing such a state that the rotative driving spindle in FIG. 10A engages the hub member in FIG. 9A.
Figure 11B:
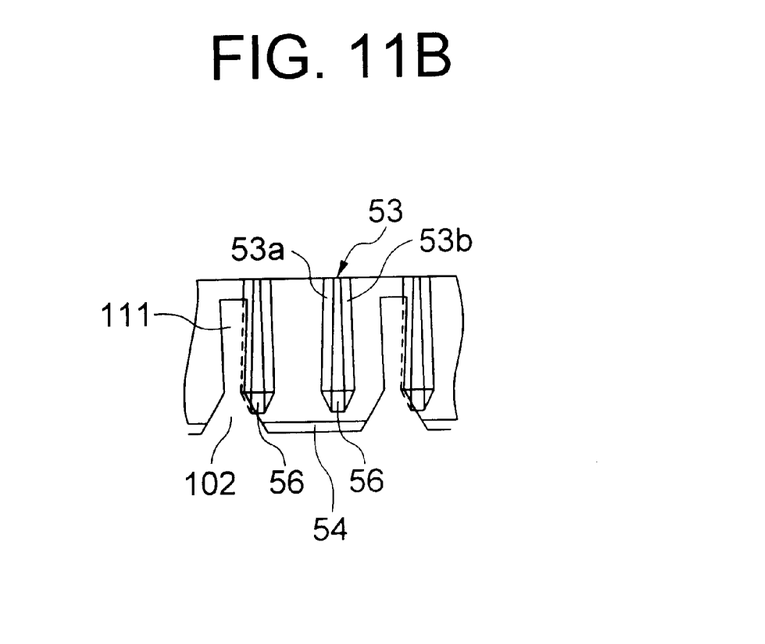
FIG 11B is a developed sideview thereof.

Given next is an explanation of modification of the second embodiment with reference to FIG. 9A to FIG. 11B. FIG. 9A is a plane view of the hub member according to the modification, FIG. 9B is a sectional view taken along the line BB—BB in FIG. 9A, FIG. 10A is a plane view showing the rotative driving spindle of the driving device according to the modification, FIG. 10B is a side view thereof, FIG. 11A is a plane view showing such a state that the rotative driving spindle engages the hub, and FIG. 11B is a developed side view thereof.

In this example, as shown in FIG. 9A and FIG. 9B, a tapered portion 56 is formed at the lower face of the hub member in the spline projection 53 in the through hole 52 of the hub members 5a and 5b. As shown in FIG. 10A and 10B, at the engagement projection 111 of the rotative driving spindle 110, the wide portion 102 is formed at the lower face in an axial direction so as to match with the form of the tapered portion 56 of the spline projection 53. By such the formation, when the rotative driving spindle 110 is inserted into the through hole 52 of the hub members 5a and 5b as shown in FIG. 11A and 11B, the vertical rotation position of the hub members 5a, 5b may be set in the vertical position which determined by the positions of the tapered portion 56 and the wide portion 102. In this example, as explained, it becomes possible to rotate the hub members 5a and 5b with an approximate distance from the inner face of the lower case 20.

The present invention has been explained by the embodiments as described above, the present invention is not limited to the above, also various modifications may be possible within the scope of the technical concept in the present invention. For example, a tape cassette is not limited for DDS and DAT, but also for others having a hub member and other than a structure that the hub member is forcibly held down, such as a tape cassette of reel structure having a flange.

As described above, according to the tape cassette and the combination structure of the tape cassette and the driving device in the present invention, it makes possible to stabilize the position of the hub members during a tape running, whereby the tape running may be stabilized, and an error may be prevented from occurring during recording and reproducing.

What is claimed is:

1. A tape cassette comprising:

a case body; and a pair of hub members stored rotatably in said case body, around which a tape member is wound, wherein each of said hub members comprises:

a body having a through hole formed therethrough for reception of a rotative driving spindle of a driving device, the through hole having a first end into which the rotative driving spindle is inserted; and a plurality of spline projections formed radially around said through hole, the spline projections extending inwardly into said through hole, each of the said spline projections having an outward taper along a length thereof towards the first end of the through hole and wherein a hub body includes an upper face and a lower face, the first end of the through hole being at the lower face such that each spline projection has a greater width at the lower face than at the upper face.

* * * * *